United States Patent
Beg et al.

(10) Patent No.: US 11,576,141 B2
(45) Date of Patent: Feb. 7, 2023

(54) ANALYZING WI-FI MOTION COVERAGE IN AN ENVIRONMENT

(71) Applicant: Cognitive Systems Corp., Waterloo (CA)

(72) Inventors: Christopher Beg, Kitchener (CA); Paul Lock, Waterloo (CA)

(73) Assignee: Cognitive Systems Corp.

( * ) Notice: Subject to any disclaimer, the term of this patent is extended or adjusted under 35 U.S.C. 154(b) by 0 days.

(21) Appl. No.: 17/826,846

(22) Filed: May 27, 2022

(65) Prior Publication Data

US 2022/0394656 A1 Dec. 8, 2022

Related U.S. Application Data

(60) Provisional application No. 63/194,723, filed on May 28, 2021.

(51) Int. Cl.
*H04W 64/00* (2009.01)
*H04W 4/02* (2018.01)
*H04W 4/029* (2018.01)

(52) U.S. Cl.
CPC .......... *H04W 64/00* (2013.01); *H04W 4/025* (2013.01); *H04W 4/029* (2018.02)

(58) Field of Classification Search
CPC ....... H04W 24/10; H04W 4/02; H04W 4/029; H04W 4/33; H04W 64/00; H04W 16/22;
(Continued)

(56) References Cited

U.S. PATENT DOCUMENTS

| 8,660,578 B1 * | 2/2014 | Yang ............ G01S 13/003 455/456.3 |
| 8,710,984 B2 | 4/2014 | Wilson et al. |

(Continued)

FOREIGN PATENT DOCUMENTS

| WO | 2015168700 | 11/2015 |
| WO | 2017106976 | 6/2017 |

(Continued)

OTHER PUBLICATIONS

WIPO, International Search Report and Written Opinion dated Aug. 26, 2022, in PCT/CA2022/050862, 7 pgs.

(Continued)

*Primary Examiner* — Kwasi Karikari
(74) *Attorney, Agent, or Firm* — Henry Patent Law Firm PLLC

(57) ABSTRACT

A method includes receiving a ground-truth motion indication from a measurement device. The ground-truth motion indication is a time series of locations and a corresponding indication of a motion state at each location of the time series of locations. The method also includes receiving a time series of detected motion states based on wireless signals communicated through a space over a time period by a wireless communication network comprising a plurality of wireless communication devices. The detected motion states for a time interval within the time series are compared to the ground-truth motion indication for the time interval within the time series to generate a time series of consistency scores. The consistency scores are processed to produce an aggregate motion-detection capability score at each location. The method also includes providing, for display as a graphical representation of motion-detection capability within the space, the aggregate motion-detection capability at each location.

27 Claims, 12 Drawing Sheets

(58) Field of Classification Search
CPC ..... H04W 24/02; H04W 24/08; H04W 4/025; H04W 88/02; H04W 36/30; H04W 40/20; H04W 52/0245; H04W 88/08
See application file for complete search history.

(56) References Cited

U.S. PATENT DOCUMENTS

| | | | |
|---|---|---|---|
| 9,523,760 | B1 | 12/2016 | Kravets et al. |
| 9,524,628 | B1 | 12/2016 | Omer et al. |
| 9,584,974 | B1 | 2/2017 | Omer et al. |
| 9,869,759 | B2 | 1/2018 | Furuskog et al. |
| 9,927,519 | B1 | 3/2018 | Omer et al. |
| 10,004,076 | B1 | 6/2018 | Griesdorf et al. |
| 10,048,350 | B1 | 8/2018 | Piao et al. |
| 10,051,414 | B1 | 8/2018 | Omer et al. |
| 10,108,903 | B1 | 10/2018 | Piao et al. |
| 10,109,167 | B1 | 10/2018 | Olekas et al. |
| 10,109,168 | B1 | 10/2018 | Devison et al. |
| 10,111,228 | B2 | 10/2018 | Griesdorf et al. |
| 10,129,853 | B2 | 11/2018 | Manku et al. |
| 10,228,439 | B1 | 3/2019 | Olekas et al. |
| 10,264,405 | B1 | 4/2019 | Manku et al. |
| 10,310,079 | B1 * | 6/2019 | Um ............... G01S 15/04 |
| 10,318,890 | B1 | 6/2019 | Kravets et al. |
| 10,380,856 | B2 | 8/2019 | Devison et al. |
| 10,393,866 | B1 | 8/2019 | Kravets et al. |
| 10,404,387 | B1 | 9/2019 | Devison et al. |
| 10,438,468 | B2 | 10/2019 | Olekas et al. |
| 10,459,074 | B1 | 10/2019 | Omer et al. |
| 10,459,076 | B2 | 10/2019 | Kravets et al. |
| 10,460,581 | B1 | 10/2019 | Devison et al. |
| 10,498,467 | B1 | 12/2019 | Ravkine |
| 10,499,364 | B1 | 12/2019 | Ravkine |
| 10,506,384 | B1 | 12/2019 | Omer et al. |
| 10,565,860 | B1 | 2/2020 | Omer et al. |
| 10,567,914 | B1 | 2/2020 | Omer et al. |
| 10,600,314 | B1 | 3/2020 | Manku et al. |
| 10,605,907 | B2 | 3/2020 | Kravets et al. |
| 10,605,908 | B2 | 3/2020 | Kravets et al. |
| 10,743,143 | B1 | 8/2020 | Devison et al. |
| 10,798,529 | B1 | 10/2020 | Beg et al. |
| 10,849,006 | B1 | 11/2020 | Beg et al. |
| 11,006,245 | B2 | 5/2021 | Omer |
| 11,012,122 | B1 | 5/2021 | Beg et al. |
| 11,018,734 | B1 | 5/2021 | Beg |
| 11,070,399 | B1 | 7/2021 | Omer et al. |
| 11,087,604 | B2 | 8/2021 | Beg et al. |
| 2012/0146788 | A1 | 6/2012 | Wilson et al. |
| 2014/0247179 | A1 | 9/2014 | Furuskog |
| 2017/0311279 | A1 * | 10/2017 | Gao ............... G01S 5/021 |
| 2017/0359804 | A1 | 12/2017 | Manku et al. |
| 2018/0270821 | A1 | 9/2018 | Griesdorf et al. |
| 2019/0122514 | A1 | 4/2019 | Olekas et al. |
| 2019/0146075 | A1 | 5/2019 | Kravets et al. |
| 2019/0146076 | A1 | 5/2019 | Kravets et al. |
| 2019/0146077 | A1 | 5/2019 | Kravets et al. |
| 2019/0147713 | A1 | 5/2019 | Devison et al. |
| 2019/0170869 | A1 | 6/2019 | Kravets et al. |
| 2019/0339084 | A1 * | 11/2019 | Korenaga ........ G08G 1/096883 |
| 2019/0349715 | A1 * | 11/2019 | Ghourchian ............ G01S 7/415 |
| 2019/0384409 | A1 | 12/2019 | Omer et al. |
| 2020/0175405 | A1 | 6/2020 | Omer et al. |
| 2020/0178033 | A1 | 6/2020 | Omer et al. |
| 2020/0264292 | A1 | 8/2020 | Kravets et al. |
| 2020/0351576 | A1 | 11/2020 | Beg et al. |
| 2020/0351692 | A1 | 11/2020 | Beg et al. |

FOREIGN PATENT DOCUMENTS

| | | |
|---|---|---|
| WO | 2017132765 | 8/2017 |
| WO | 2017210770 | 12/2017 |
| WO | 2018094502 | 5/2018 |

OTHER PUBLICATIONS

Beg, et al., "Sensing Transmission in Partial Bandwidths", IEEE 802.11-14/1602r2, May 26, 2022, 34 pgs.

"Telecommunications and information exchange between systems Local and metropolitan area networks—Specific requirements Part 11: Wireless LAN Medium Access Control (MAC) and Physical Layer (PHY) Specifications—Amendment 4: Enhancements for positioning", IEEE P802.11az/D4.0, Aug. 2021, vol. no., pp. 1-282, Oct. 7, 2021, 282 pgs.

"Telecommunications and information exchange between systems Local and metropolitan area networks—Specific requirements Part 11: Wireless LAN Medium Access Control (MAC) and Physical Layer (PHY) Spe", IEEE P802.11ax/D8.0, Oct. 2020 (approved draft), vol. no., pp. 1-820, Feb. 10, 2021, 820 pgs.

Da Silva, "Specification Framework for TGbf", IEEE P802.11, Wireless LANs, Mar. 14, 2022, 21 pgs.

Katla, "Sensing-specific feedback using NDPA and trigger frames", IEEE 802.11-21/1035r2, Sep. 15, 2021, 18 pgs.

Ma, et al., "WiFi Sensing with Channel State Information: A Survey", ACM Comput. Surv., vol. 52, No. 3, Article 46, Jun. 2019, 36 pgs.

Zhang, et al., "Enabling Joint Communication and Radar Sensing in Mobile Networks—A Survey", arXiv:2006.07559v3, Jan. 16, 2021, 32 pgs.

* cited by examiner

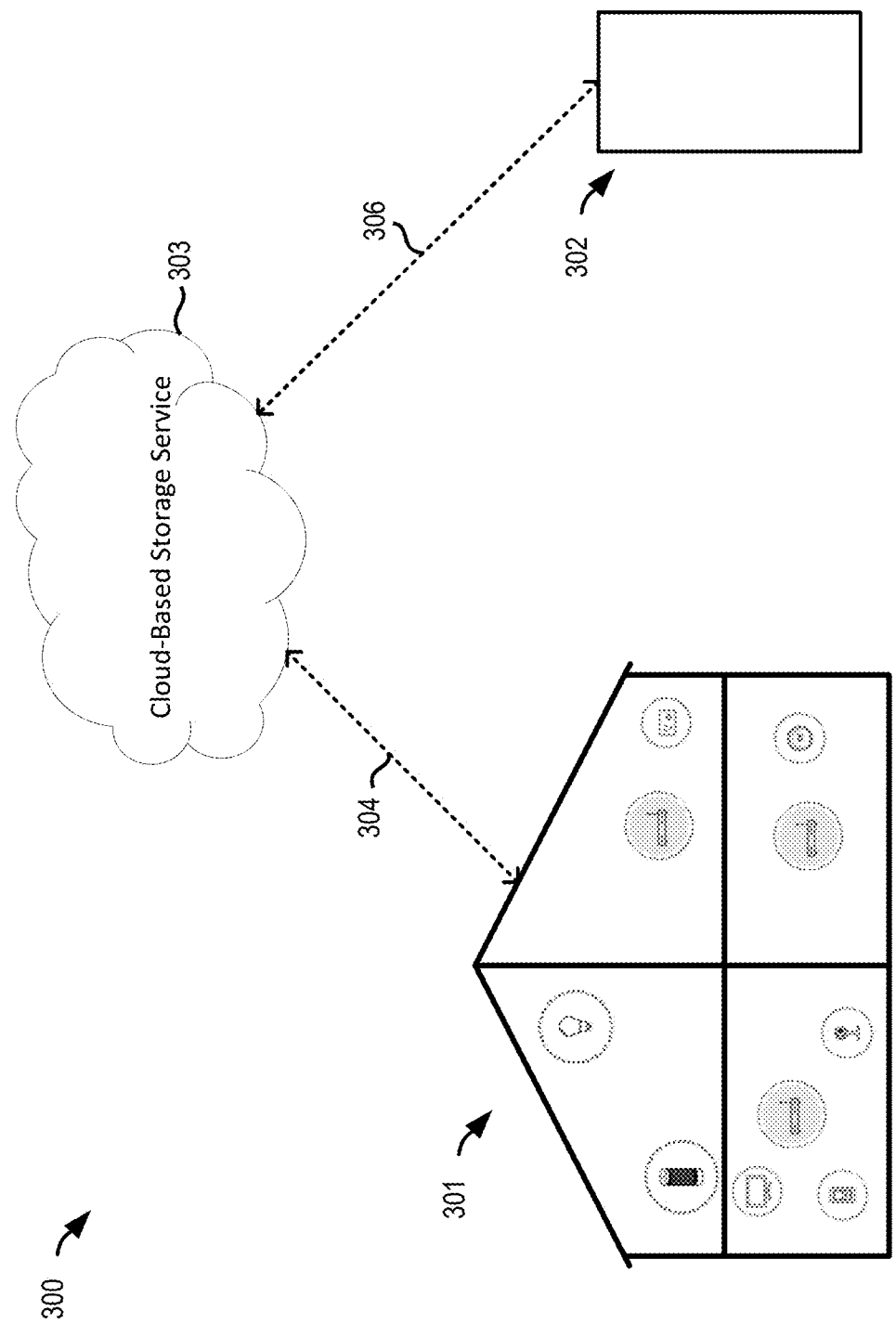

ANALYZING WI-FI MOTION COVERAGE IN AN ENVIRONMENT

CROSS-REFERENCE TO RELATED APPLICATIONS

This patent application claims priority to, and incorporates by reference for any purpose the entire disclosure of, U.S. Provisional Patent Application No. 63/194,723, filed on May 28, 2021.

BACKGROUND

The following description relates to analyzing Wi-Fi motion coverage in an environment.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DESCRIPTION OF DRAWINGS

FIG. 3 is a diagram showing an example system for providing the output of the motion detection system as a graphical display on a device.

DETAILED DESCRIPTION

Figure 1:
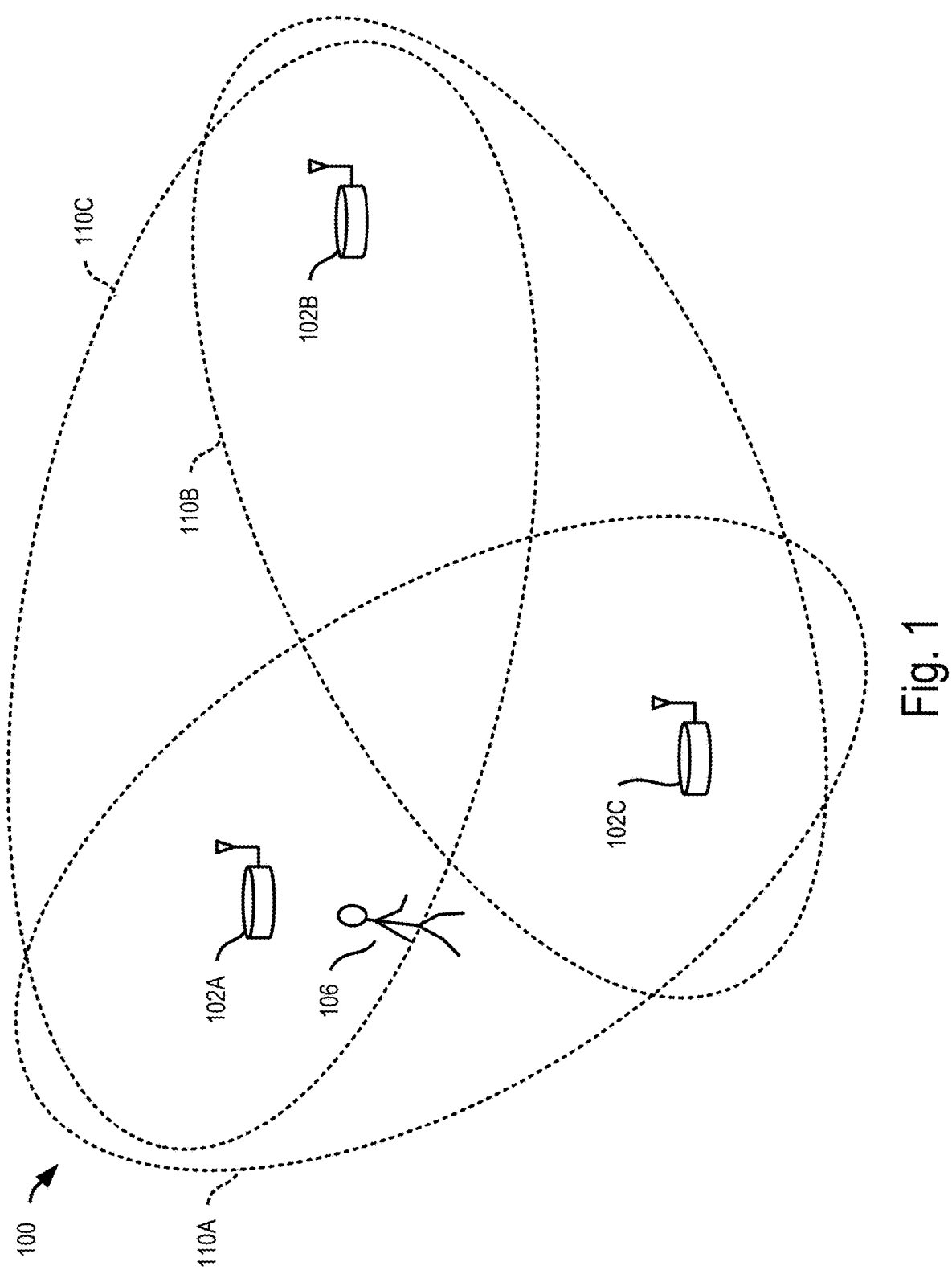
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, sleep quality monitoring, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. In some instances, wellness monitoring using the wireless sensing systems described herein may provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, the output of a motion detection system may be provided as a graphical display interface on a device. The graphical display can be used, for example, to give a user a visual representation of motion coverage (e.g., Wi-Fi motion coverage) in a space. The visual representation can be used to indicate the relative performance of the motion detection system in various areas in the space. In various embodiments, such a system may provide a user with a visual indication that additional wireless communication devices are needed for adequate motion-detection capability or that re-location of one or more wireless communication devices may improve motion-detection capability.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on an access point device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data. In some implementations, motion data is a result that is indicative of a degree of motion in the space, the location of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 illustrates an example wireless communication system 100. The wireless communication system 100 may perform one or more operations of a motion detection system. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include: networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system, or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of a motion detection system.

Figure 2A:
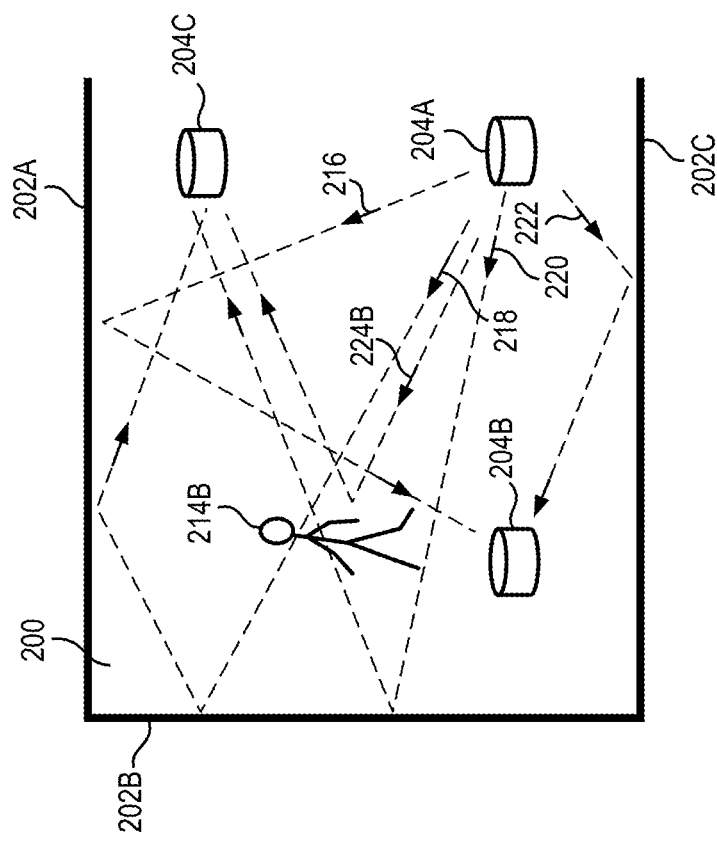
FIGS. 2A-2B are diagrams showing example wireless signals communicated between wireless communication devices.
Figure 2B:
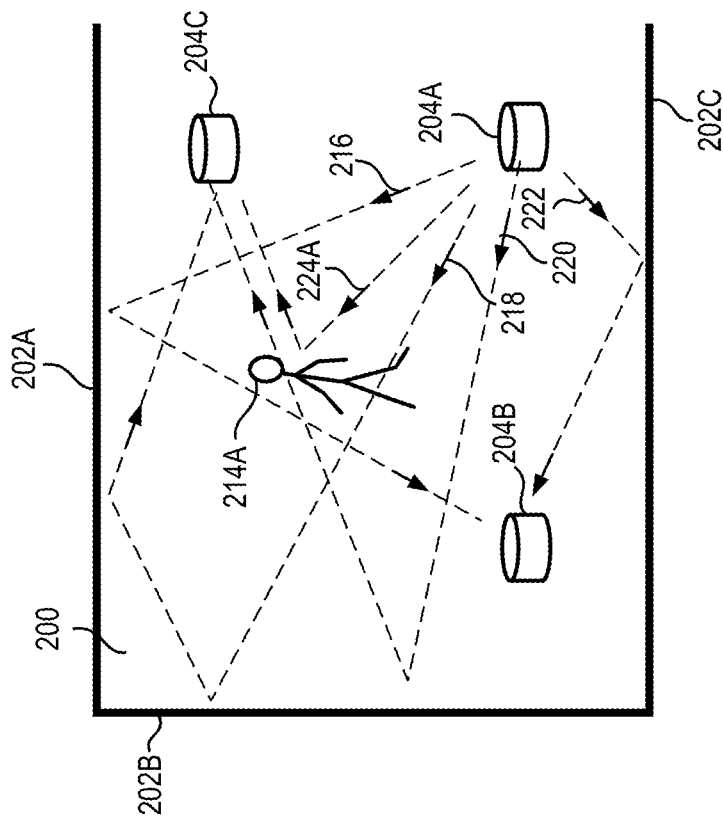

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled, or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C are mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B can experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal can have a number of frequency components in a frequency bandwidth, and the transmitted signal may include one or more bands within the frequency bandwidth. The transmitted signal may be transmitted from the first wireless communication device 204A in an omnidirectional manner, in a directional manner, or otherwise. In the example shown, the wireless signals traverse multiple respective paths in the space 200, and the signal along each path can become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect motion of an object. Conversely, in some cases, if the transfer function of the space does not change, the output of the transfer function—the received signal—may not change.

Figure 2C:
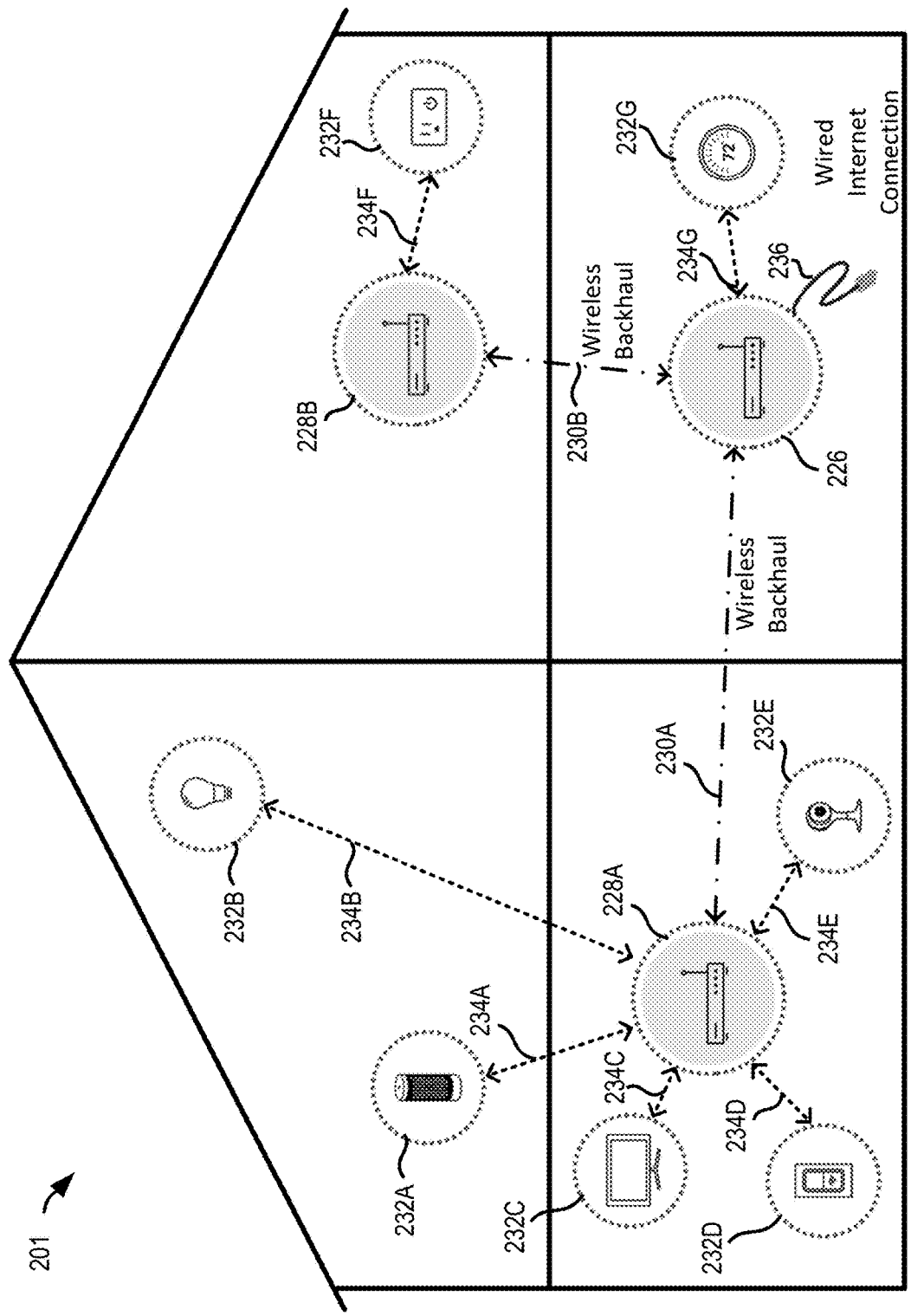
FIG. 2C is a diagram showing an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP can use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as leaf nodes in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 can identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP can select its own channel independently to serve their respective client devices, and the wireless links 234 may be used for data communications as well as motion detection.

The motion detection system, which may include one or more motion detection or localization processes running on one or more of the client devices 232 or on one or more of the APs 226, 228, may collect and process data (e.g., channel information) corresponding to local links that are participating in the operation of the wireless sensing system. The motion detection system can be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system are executed on one or more of the client devices 232. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 can have access to channel information provided by the client device's radio firmware (e.g., Wi-Fi radio firmware) so that channel information may be collected and processed.

In some implementations, the client devices 232 send a request to their corresponding AP 226, 228 to transmit wireless signals that can be used by the client device as motion probes to detect motion of objects in the space 201. The request sent to the corresponding AP 226, 228 may be a null data packet frame, a beamforming request, a ping, standard data traffic, or a combination thereof. In some implementations, the client devices 232 are stationary while performing motion detection in the space 201. In other examples, one or more of the client devices 232 can be mobile and may move within the space 201 while performing motion detection.

Mathematically, a signal f (t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k$ (t) from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k$ (t) from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device (e.g., the wireless communication devices 204B, 204C in FIGS. 2A and 2B or the client devices 232 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value $Y_n$) can be indicative of motion of an object within the communication channel. Conversely, a stable channel response may indicate lack of motion. Thus, in some implementations, the complex values $Y_n$ for each of multiple devices in a wireless network can be processed to detect whether motion has occurred in a space traversed by the transmitted signals f(t). The channel response can be expressed in either the time-domain or frequency-domain, and the Fourier-Transform or Inverse-Fourier-Transform can be used to switch between the time-domain expression of the channel response and the frequency-domain expression of the channel response.

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, the beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some implementations, the output of the motion detection system may be provided as a graphical display on a user interface on a device. FIG. 3 is a diagram showing an example system 300 for providing the output of the motion detection system as a graphical display on a device 302. The example system 300 includes a space 301, the device 302, and a cloud-based storage service 303. The example system 300 can be used, for example, to measure motion coverage (e.g., Wi-Fi motion coverage) in the space 301 and to provide a visual illustration that indicates the relative performance of the motion detection system in various areas in the space 301.

In some instances, the space 301 can be identified with the space 201 shown in FIG. 2C and can be a home that includes multiple distinct spatial regions or zones. Each spatial region in the space 301 can include respective wireless communication devices that participate in motion detection. In various embodiments, the wireless communication devices included in the space 301 may be, for example, the wireless communication devices 102A, 102B, 102C illustrated in FIG. 1 or the wireless communication devices 204A, 204B, 204C illustrated in FIGS. 2A and 2B. The motion detection system operating in the space 301 and the cloud-based storage service 303 may be communicatively coupled by a network 304. In some instances, the network 304 includes the Internet, one or more telephony networks, one or more network segments including local area networks (LANs) and wide area networks (WANs), one or more wireless networks, or a combination thereof.

The output of the motion detection system (e.g., motion data) operating in the space 301 may be stored on the cloud-based storage service 303. For example, the output of the motion detection system may be pushed (via network 304) to the cloud-based storage service 303; in other instances, the output of the motion detection system may be fetched (via network 304) by the cloud-based storage service 303. The device 302 (e.g., a user device) may connect to the cloud-based storage service 303 using network 306, which can include the Internet, one or more telephony networks, one or more network segments including local area networks (LANs) and wide area networks (WANs), one or more wireless networks, or a combination thereof. In some instances, the device 302 can receive the output of the motion detection system (e.g., motion data) by connecting (e.g., directly connecting) to the motion detection system operating in the space 301, thereby circumventing the cloud-based storage service 303. In such instances, the device 302 can connect to the motion detection system using a Message Queuing Telemetry Transport (MQTT) broker or other data transfer protocol.

Figure 4A:
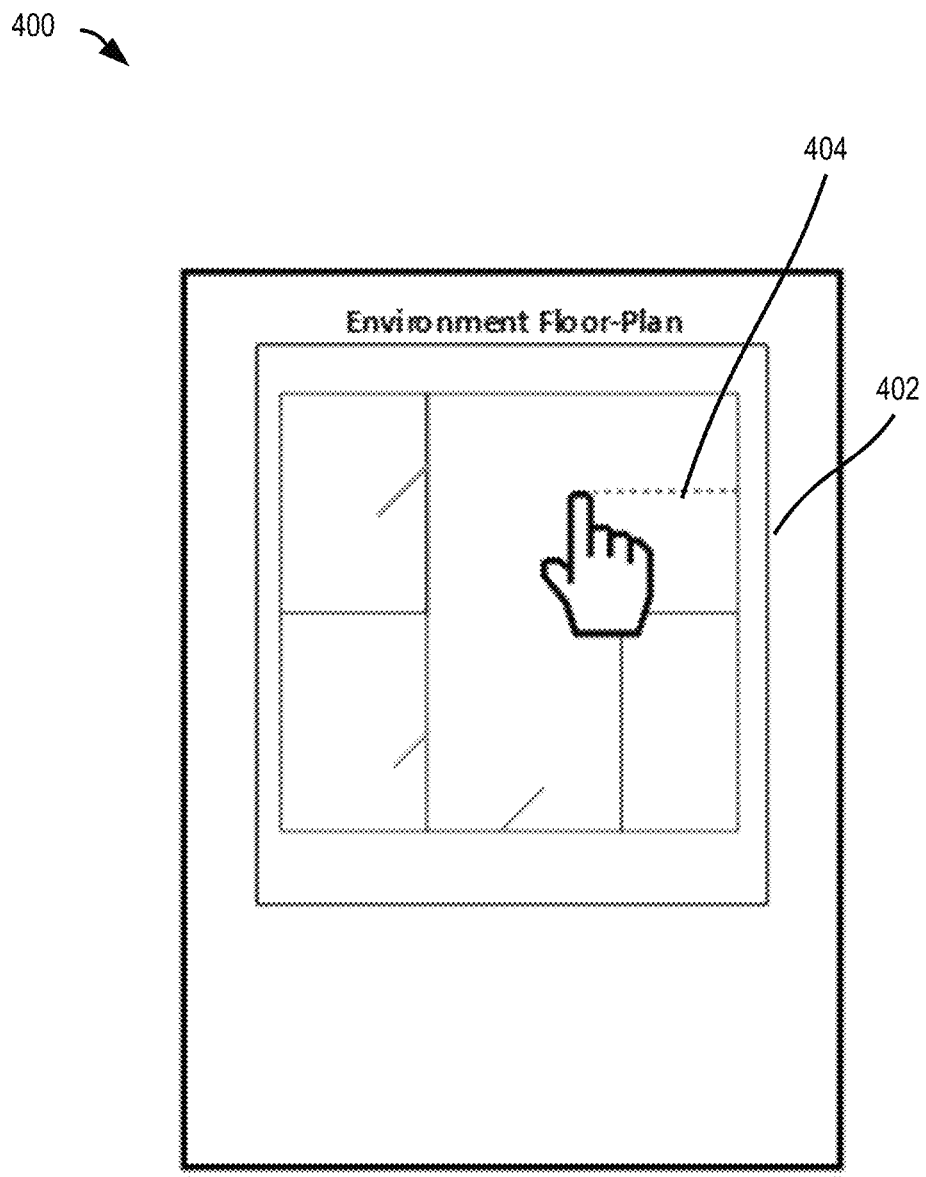
FIG. 4A shows an example user interface of a device showing an example floorplan and an example trajectory that a user has indicated on the floorplan.

One function of the device 302 is to record a "ground-truth" motion indication. "Ground-truth" motion refers to a known reference of when and where motion has occurred on visualization of the space 301. In various embodiments, the ground-truth motion indication may be, for example, a time series of locations within the space 301 along with a corresponding indication of a motion state at least location within the time series of locations. In such an embodiment, a motion state is an indication of motion or no motion. In some embodiments, the device 302 may be a, for example, smart phone or mobile device application, that the user may carry while performing testing. In such an embodiment, the device 302 may record ground-truth motion by having the user input when and where they are moving using, for example, a touch screen interface on the device 302, as the user performs the test. In such an embodiment, the floorplan can show the relative positions of the multiple distinct spatial regions or zones in the space 301. In some instances, the device 302 has a user interface that allows a user to trace out a trajectory in the floorplan as the user is moving through the space 301. FIG. 4A shows an example user interface 400 of the device 302. The example user interface 400 of FIG. 4A shows an example floorplan 402 and an example trajectory 404 that a user has indicated on the floorplan 402. In some instances, an example trajectory 404 can be indicated, for example, through a touch-screen interface or a mouse pointer of the device 302.

Figure 4B:
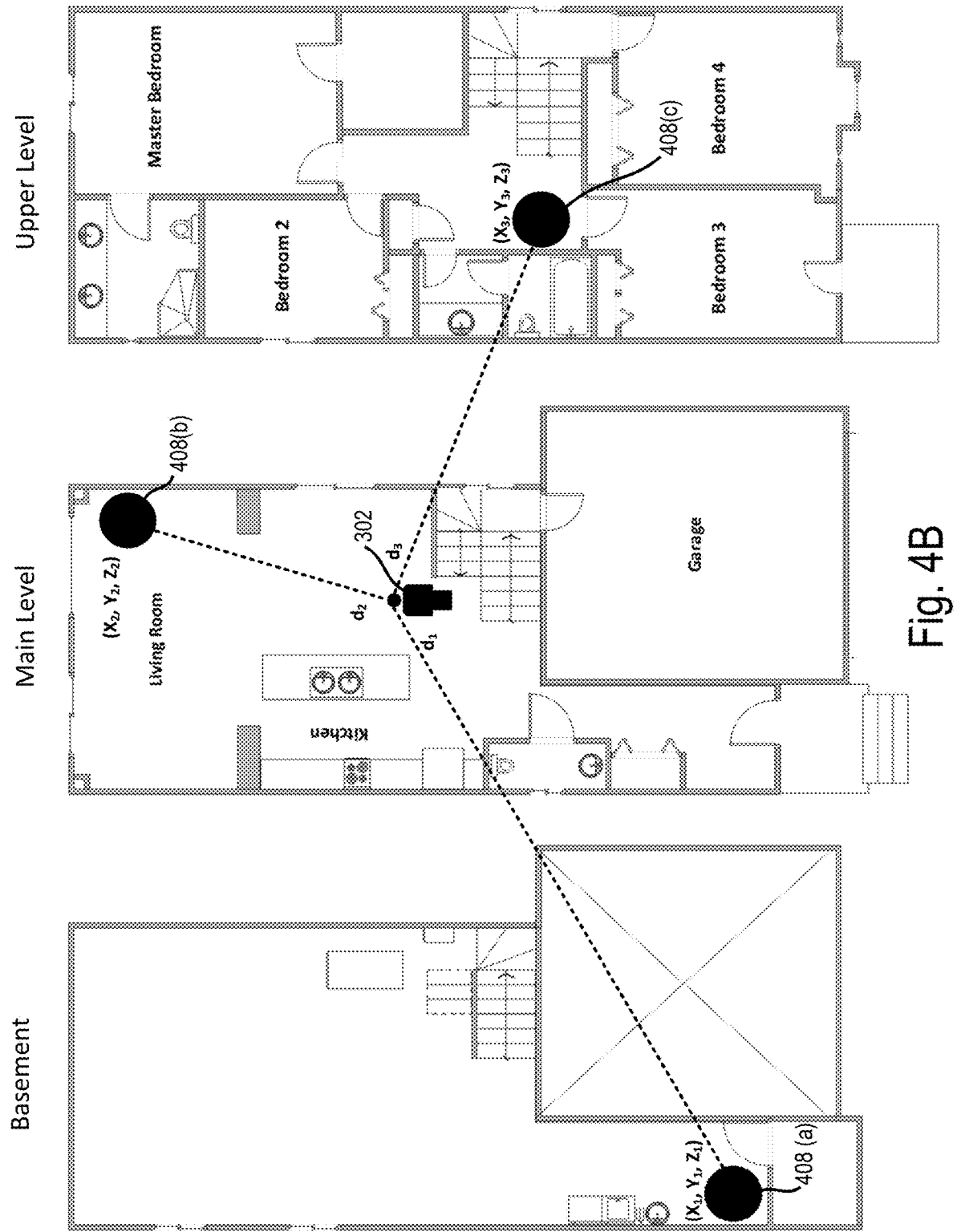
FIG. 4B shows an example floorplan and exemplary ranging of a user device.

In other embodiments, the device 302 may utilize capabilities such as, for example, Wi-Fi time-of-flight or ranging/positioning. FIG. 4B illustrates an example of the device 302 utilizing WiFi ranging. In such an embodiment, the device 302 periodically measures the distance to multiple fixed location devices 408 with known coordinates. In the example illustrated in FIG. 4B, the device 302 measures a distance to a first fixed-location device 408(a), which is located on a basement level; a second fixed-location device 408(b), which is located on a main level; and a third fixed-location device 408(c), which is located on an upper level. For discussion purposes, the fixed-location device 408(a), the fixed-location device 408(b), and the fixed-location device 408(c) are referred to collectively herein as fixed-location devices 408. Given distance measurements to multiple fixed-location devices 408, the device 302 may automatically triangulate its coordinates within the space 301. In various embodiments, the device 302 updates the triangulated coordinates periodically or continuously in order to plot the ground-truth motion indication. In various embodiments, the fixed-location devices 408 are Wi-Fi access points or another type of wireless access point (WAP). In some cases, the fixed-location devices 408 may be, for example, an access point of a wireless mesh network, such as, for example, a commercially-available mesh network system (e.g., GOOGLE Wi-Fi, EERO mesh, etc.). In various embodiments, the fixed-location devices 408 may be, for example, the wireless communication devices 102A, 102B, 102C illustrated in FIG. 1 or the wireless communication devices 204A, 204B, 204C illustrated in FIGS. 2A and 2B.

Another function of the device 302 is to correlate and compare ground-truth information with the detection of motion to produce a visualization of regions within the space 301 where motion detection is relatively stronger compared to other regions. In some instances, the device 302 can receive motion data from the cloud-based storage service 303 based on the trajectory 404 indicated in the device 302 or determined by, for example, Wi-Fi ranging. For example, the motion data for each location along the trajectory 404 can be received from the cloud-based storage service 303. In some implementations, the trajectory 404 and the motion data along the trajectory 404 can be simultaneously displayed on a user interface on the device 302 as a heat map that indicates the relative levels of motion detected along the trajectory 404. In various embodiments, the motion data may be, for example, a time-series of detected motion states.

Figure 5A:
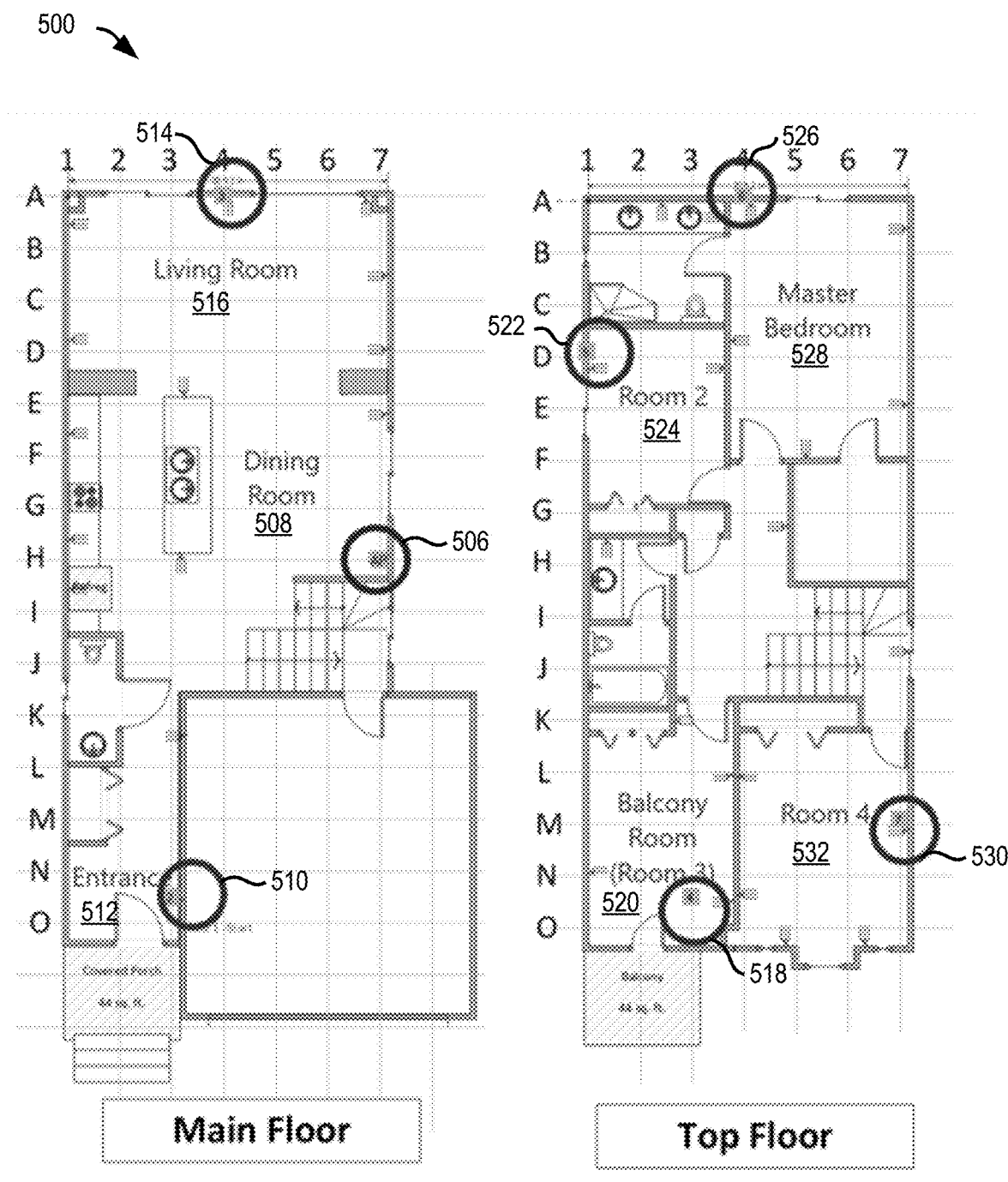
FIG. 5A shows an example floorplan of a space illustrating placement of wireless devices.

FIG. 5A is an illustration of an exemplary floorplan 500 having a first floor 502 and a second floor 504. An access point 506 is located in a dining room 508 on the first floor 502, a first station 510 is located in an entry 512 on the first floor, and a second station 514 is located in a living room 516. On the second floor 504, a third station 518 is located in a third bedroom 520. A fourth station 522 is located in a second bedroom 524, a fifth station 526 is located in a first bedroom 528, and a sixth station 530 is located in a fourth bedroom 532. All stations are able to communicate with the access point 506, at least for purposes of sensing as either associated devices, or unassociated devices, or a mix of associated and unassociated devices. In various embodiments, the access point 506, the first station 510, the second station 514, the third station 518, the fourth station 522, the fifth station 526, and the sixth station 530 may correspond to the wireless communication devices 102A, 102B, 102C illustrated in FIG. 1, the wireless communication devices 204A, 204B, 204C illustrated in FIGS. 2A and 2B, or the fixed-location devices 408 illustrated in FIG. 4B.

Figure 5B:
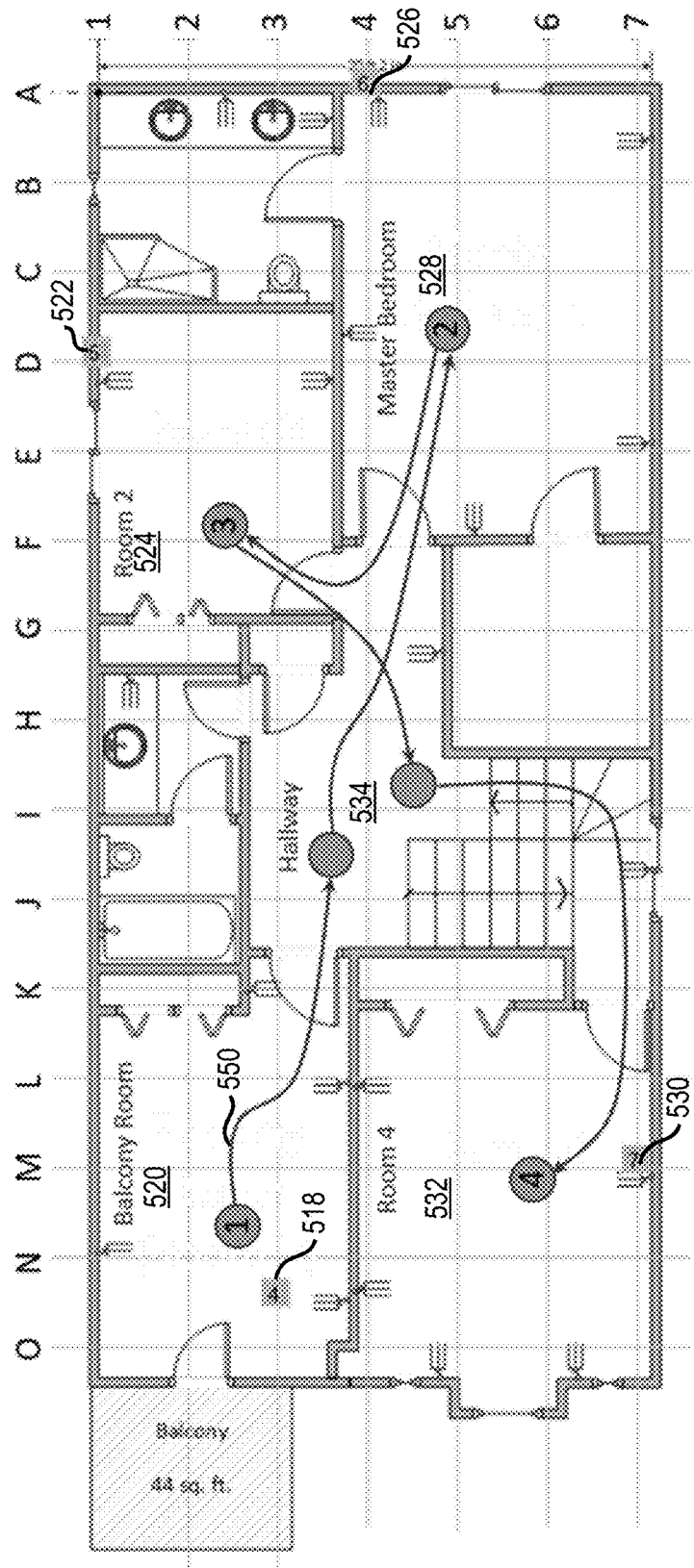
FIG. 5B shows an example motion path for obtaining ground truth motion.

FIG. 5B illustrates an exemplary walking path 550 that may be used, for example, to establish ground truth for motion-detection capability evaluation. The test subject begins in the third bedroom 520 and walks through a hallway 534 to the first bedroom 528. The test subject then returns to the hallway 534 and enters the second bedroom 524. The test subject then leaves the second bedroom 524 and walks to the fourth bedroom 532 via the hallway 534. The walking path 550 illustrated in FIG. 5B is exemplary only and other paths or trajectories may be utilized for purposes of evaluating motion-detection capability.

Figure 5C:
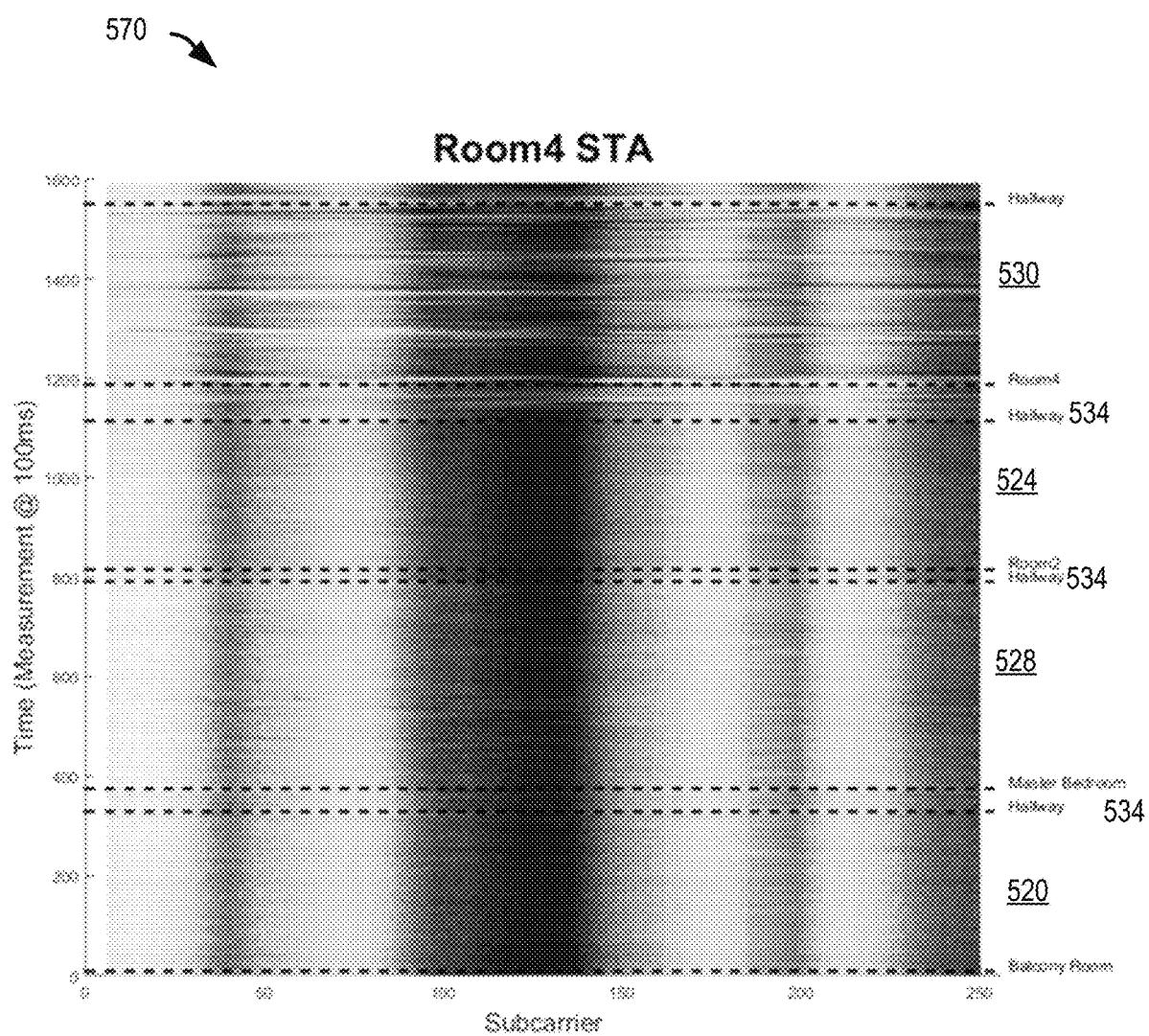
FIG. 5C shows a graph of frequency versus time illustrating magnitude of channel response disturbance caused by motion in the space.

FIG. 5C is a graph 570 of subcarrier frequency (x-axis) versus time (y-axis). In FIG. 5C, shading indicates a magnitude response (magnitude vs. frequency) of the channel, computed from raw CSI measurements which may be represented in complex ("I/Q") form, measured at the access point 506. By way of example, the plot 570 illustrates motion-detection capability of the link between the sixth station 530 located in the fourth bedroom 532 and the access point 506 illustrating motion occurring in or near the fourth bedroom 532. The channel's magnitude response between two devices remains stable as the test subject moves from the third bedroom 520 to the hallway 534, to the first bedroom 528, back to the hallway 534, and to the second bedroom 524, thereby indicating that no motion is detected in those regions by the link between the sixth station 530 and the access point 506. The channel response of the link between the sixth station 530 and the access point 506 becomes disturbed as the test subject passes through the hallway 534 towards the fourth bedroom 532. This indicates that, as motion nears the fourth bedroom 532, the link between sixth station 530 and the access point 506 begins to detect motion within the fourth bedroom 532 and in the region of the hallway 534 just outside the fourth bedroom 532. The channel response reaches its highest level of disturbance in the fourth bedroom 532, indicating that the sixth station 530 is most sensitive to motion occurring within the fourth bedroom 532 and in the regions immediately outside the fourth bedroom 534.

Figure 5D:
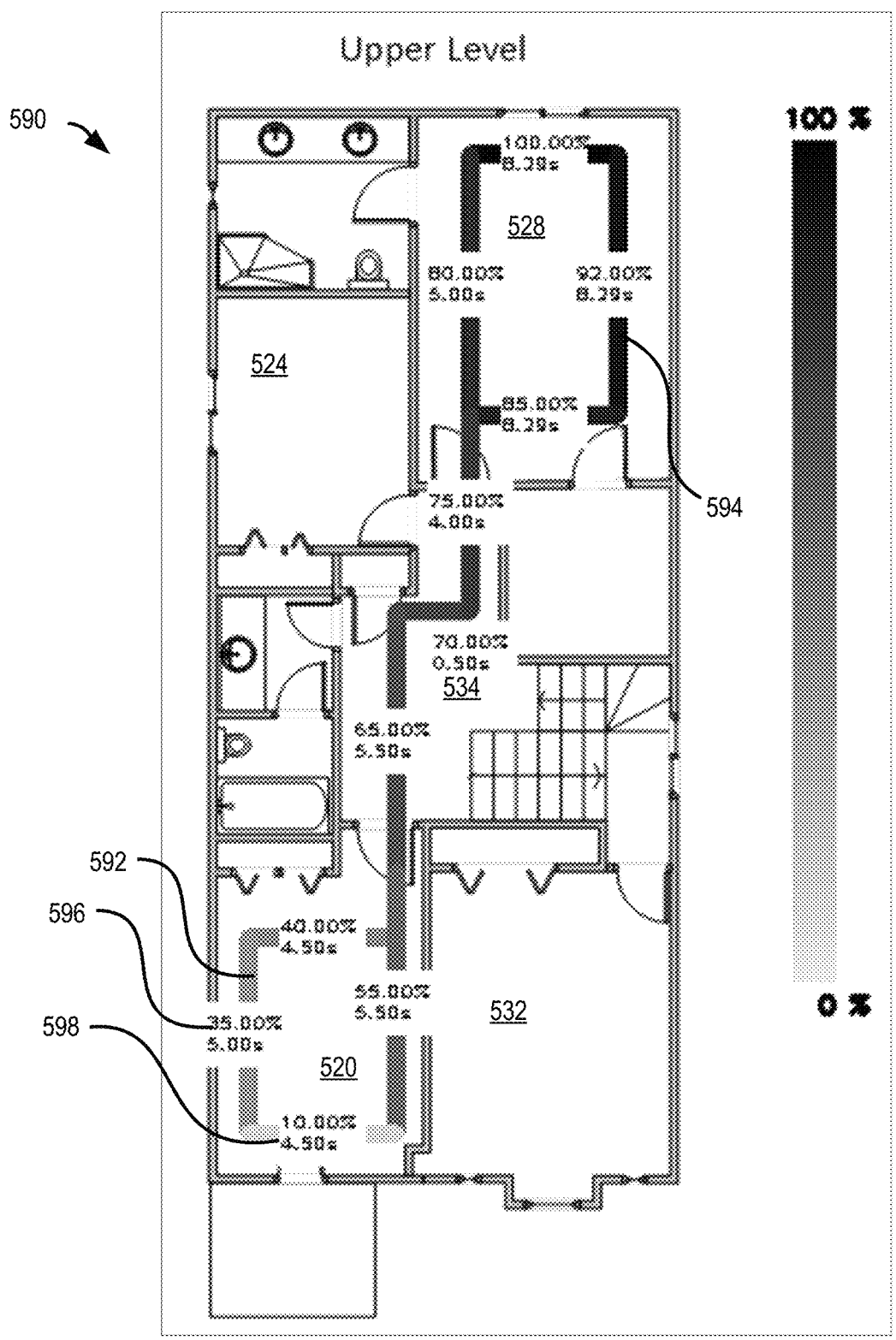
FIG. 5D shows an example heat map indicating the relative levels of motion detecting along a trajectory through a floorplan.

FIG. 5D shows an example heat map 590 indicating the relative levels of motion detecting along a trajectory through a floorplan. The relative levels of motion can, in some instances, correspond to (or can be) the motion scores at each location along the trajectory. As seen in the example shown in FIG. 5D, some portions 592 of the trajectory illustrate relatively lower levels of motion-detection capability, while other portions 594 of the trajectory have relatively higher levels of motion detection capability. For example, according the heat map illustrated in FIG. 5D, the first bedroom 528 exhibits stronger motion-detection capability than the third bedroom 520. When constructing the heat map 590, the motion detection system makes a prediction of motion at regular time intervals. Such a prediction of motion is quantized into a binary prediction of motion/no-motion. That is, the motion detection system predicts if motion is present or not during a given time interval. In various embodiments, the regular time intervals are, for example, every 0.5 seconds; however, in other embodiments, other time intervals could be utilized. Each motion prediction is compared to the corresponding time interval in the ground-truth motion indication for a measurement of consistency or inconsistency, thereby producing a time series of consistency scores. The time series of consistency scores is then processed to produce an aggregate motion-detection capability score. In various embodiments, processing the time series of consistency scores includes comparing the difference between the ground-truth motion indication and the prediction of motion and integrating the difference over time to arrive at an aggregate motion-detection capability score. In various embodiments the aggregate motion-detection capability is displayed as a percentage 596 on the heat map 590. Also displayed on the heat map 590 is a time indication 598 for each leg of the detected motion. The time indication displays a time elapsed during each segment of the measured trajectory. The heat map 590 can be used to visually represent the performance of a motion detection system that is deployed in a given space (e.g., a home). In various embodiments the heat map 590 is generated by the device 302; however, in other embodiments, the heat map 590 may be generated by any of the access point 506, the first station 510, the second station 514, the third station 518, the fourth station 522, the fifth station 526, and the sixth station 530.

In various embodiments, the ground-truth motion indication is captured asynchronously to the motion detection. For example, in various embodiments, the ground-truth motion indication may be recorded by the device 302, while the motion detection is performed any wireless communication device that is in communication with the WiFi-motion detection system. Thus, an internal clock of the device 302 is synchronized with the Wi-Fi-motion detection system. This synchronization allows data points from the source of the ground-truth motion indication and data points from the source of motion detection to be synchronized in time, allowing for an accurate correlation to be made.

In some embodiments, the use of a public internet time service may be utilized by both the motion detection system and the device 302. An internet time service uses the network time protocol ("NTP"), and allows multiple devices to both synchronize their local time to a third party reference time with a high degree of accuracy. In other embodiments, NTP may be used by the device 302 to directly synchronize the time of the motion detection system.

In either embodiment, the motion detection system adds a timestamp (either time synchronized to a third party reference, or its local time) to each motion/no-motion prediction that is transferred to the device 302.

In either embodiment, the device 302 has either indirectly (through a third party reference) or directly synchronized its time to the motion detection system. The device 302 must then reference the collected ground-truth information to be relative to the synchronized time. By having the motion/no-motion prediction and ground-truth referenced to the same common time-base, an accurate correlation of motion to ground-truth may be performed.

As an optional step to improve accuracy, in some embodiments the motion detection system may adjust the motion/no-motion timestamp to account for any processing delays rather than timestamping the result after processing has completed. In some embodiments, depending on implementation, each CSI measurement may include a timestamp provided by the radio which represents the network time at which CSI was obtained. This allows the motion detection system to reference when each measurement was performed. An additional synchronization of the radio network time to the motion detection system's time allows the CSI measurement time to be expressed relative to the motion detection system's (and measurement tool's) time reference. This measurement time knowledge may be used to accurately timestamp the motion/no-motion prediction to reflect the time the measurement was performed rather than the time it was processed.

Figure 6:
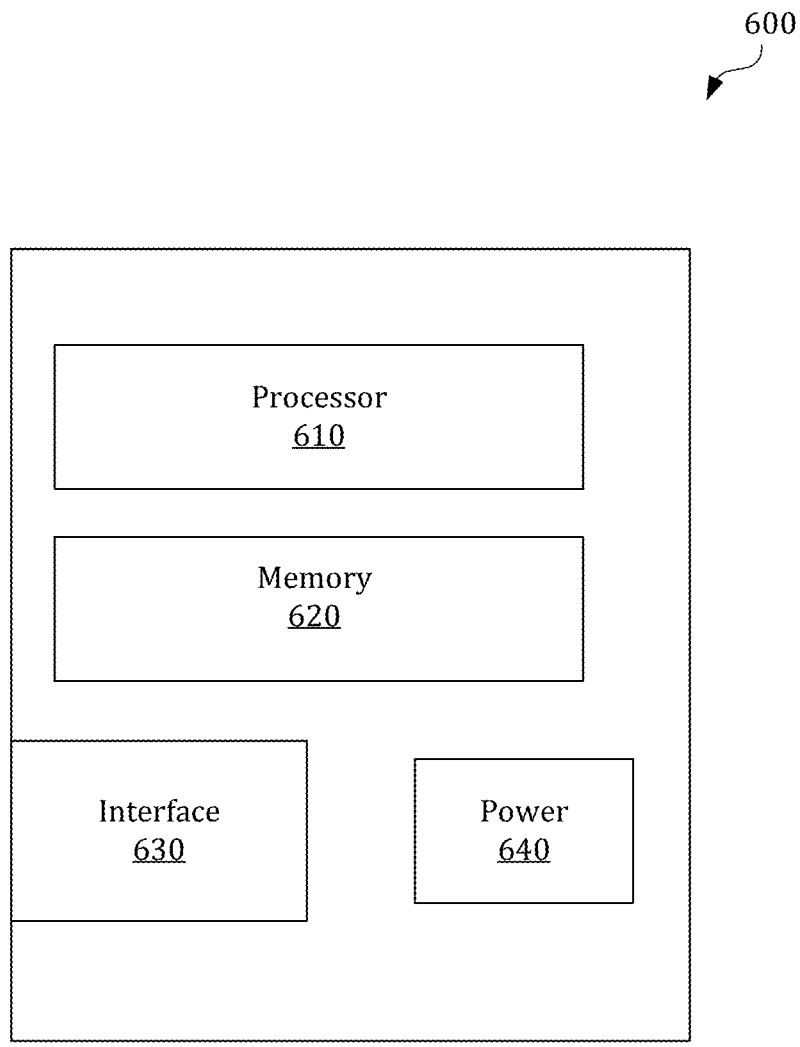
FIG. 6 is a block diagram showing an example wireless communication device.

FIG. 6 is a block diagram showing an example wireless communication device 600. As shown in FIG. 6, the example wireless communication device 600 includes an interface 630, a processor 610, a memory 620, and a power unit 640. A wireless communication device (e.g., any of the wireless communication devices 102A, 102B, 102C in FIG. 1, the devices 204A, 204B, 204C in FIGS. 2A and 2B, the devices 228, 232 in FIG. 2C, or the device 302 in FIG. 3) may include additional or different components, and the wireless communication device 600 may be configured to operate as described with respect to the examples above. In some implementations, the interface 630, processor 610, memory 620, and power unit 640 of a wireless communication device are housed together in a common housing or other assembly. In some implementations, one or more of the components of a wireless communication device can be housed separately, for example, in a separate housing or other assembly.

The example interface 630 can communicate (receive, transmit, or both) wireless signals. For example, the interface 630 may be configured to communicate radio frequency (RF) signals formatted according to a wireless communication standard (e.g., Wi-Fi, 4G, 5G, Bluetooth, etc.). In some implementations, the example interface 630 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 610 can execute instructions, for example, to generate output data based on data inputs. The instructions can include programs, codes, scripts, modules, or other types of data stored in memory 620. Additionally or alternatively, the instructions can be encoded as pre-programmed or re-programmable logic circuits, logic gates, or other types of hardware or firmware components or modules. The processor 610 may be or include a general-purpose microprocessor, as a specialized co-processor or another type of data processing apparatus. In some cases, the processor 610 performs high level operation of the wireless communication device 600. For example, the processor 610 may be configured to execute or interpret software, scripts, programs, functions, executables, or other instructions stored in the memory 620. In some implementations, the processor 610 may be included in the interface 630 or another component of the wireless communication device 600.

The example memory 620 may include computer-readable storage media, for example, a volatile memory device, a non-volatile memory device, or both. The memory 620 may include one or more read-only memory devices, random-access memory devices, buffer memory devices, or a combination of these and other types of memory devices. In some instances, one or more components of the memory can be integrated or otherwise associated with another component of the wireless communication device 600. The memory 620 may store instructions that are executable by the processor 610.

The example power unit 640 provides power to the other components of the wireless communication device 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and coverts the external power signal to an internal power signal conditioned for a component of the wireless communication device 600. The power unit 620 may include other components or operate in another manner.

Figure 7:
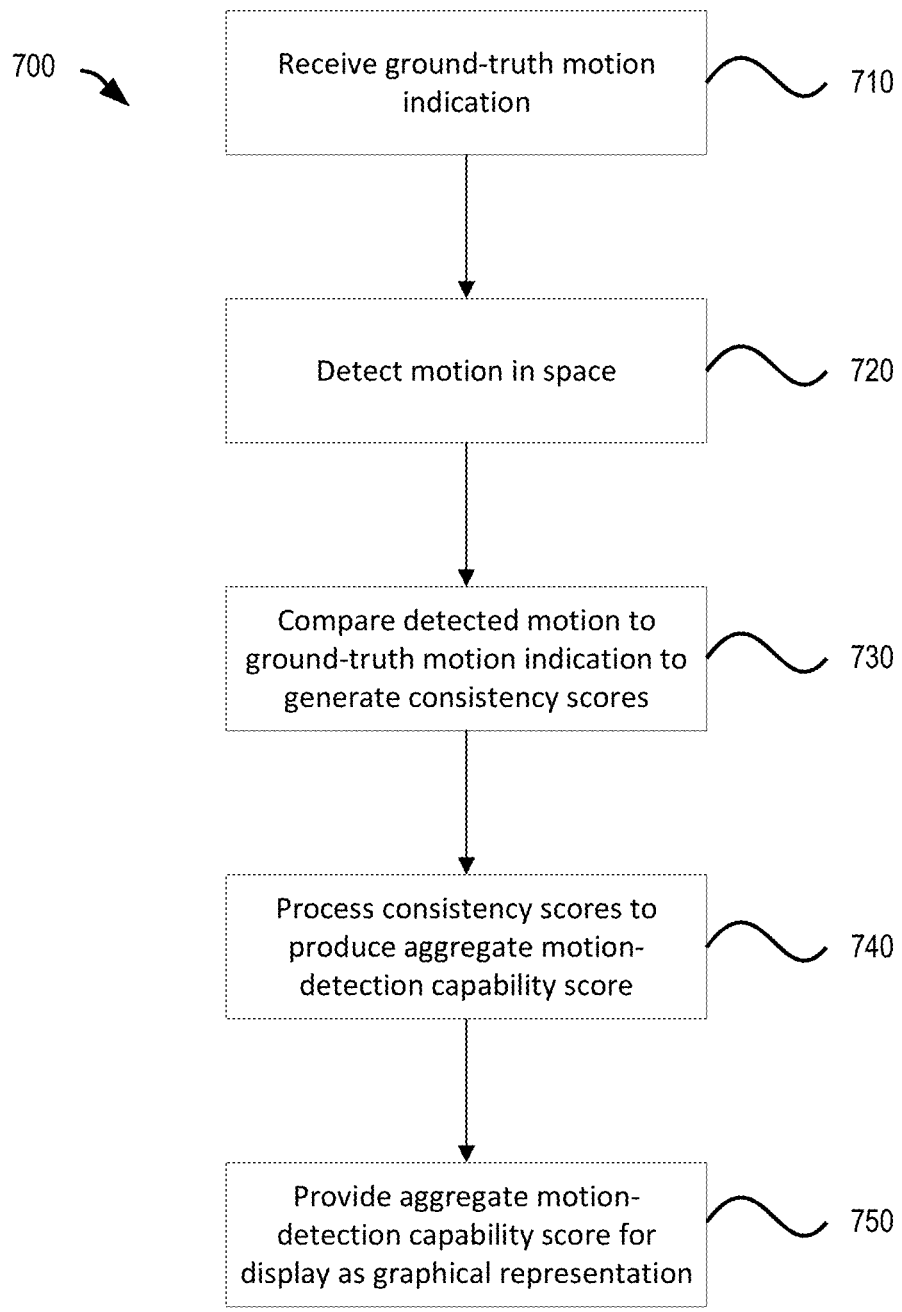
FIG. 7 is a flow chart illustrating a process for evaluating motion detection capability.

FIG. 7 is a flow chart showing an example process 700 performed, for example, by a motion-detection system. Operations in the example process 700 may be performed by a data processing apparatus (e.g., a processor in a wireless communication device 102 in FIG. 1) to detect a location of motion based on signals received at wireless communication devices. The example process 700 may be performed by another type of device. For instance, operations of the process 700 may be performed by a system other than a wireless communication device (e.g., a computer system connected to the wireless communication system 100 of FIG. 1 that aggregates and analyzes signals received by the wireless communication devices 102). The motion detection system can process information based on wireless signals transmitted (e.g., on wireless links between wireless communication devices) through a space to detect motion of objects in the space (e.g., as described with respect to FIGS. 1 and 2A, 2B, 2C, or otherwise). Operations of the example process 700 may be performed by a remote computer system (e.g., a server in the cloud), a wireless communication device (e.g., one or more of the wireless communication devices), or another type of system. For example, one or more of the operations in the example process 700 may be performed by one or more of the example wireless communication devices 102A, 102B, 102C in FIG. 1, client devices 232 or the APs 226, 228 in FIG. 2C, the measurement device 302, the wireless communication devices 408 of FIG. 4B, the stations 518, 522, 526, 530 in FIGS. 5A-5B, or by a cloud-based computer system.

The example process 700 may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated, or otherwise repeated or performed another manner.

At 710, a ground-truth motion indication is received. The ground-truth motion indication is a time series of locations and a corresponding indication of a motion state at each location of the time series of locations. The motion state is an indication of motion or no motion. In various embodiments, the ground-truth motion indication may be generated, for example, through a user indication on the measurement device 302. In other embodiments, the ground-truth motion indication may be generated through, for example, wireless ranging or time-of-flight measurement of distance between the measurement device 302 and a plurality of fixed-position wireless devices. In such embodiments, the fixed-position wireless devices may be, for example, the fixed-location devices 408 illustrated in FIG. 4B.

At 720, the motion detection system receives a time series of motion states based on detected motion in the space. The time series of motion states is based on wireless signals communicated through a space over a time period by a wireless communication network that includes a plurality of wireless communication devices. In various embodiments, the plurality of wireless communication devices may be, for example a wireless access point or a wireless station in the wireless communication network. In various embodiments, the plurality of wireless communication devices may be, for example, the stations 518, 522, 526, 530 illustrated in FIGS. 5A-5B.

At 730, the detected motion states are compared to the ground-truth motion indication at a corresponding time within the time series. The comparison determines if the ground-truth motion indication is consistent or inconsistent with the detected motion states and produces a time series of consistency scores.

At 750, the consistency scores are processed to produce an aggregate motion-detection capability score for each location. The aggregate motion-detection capability score is provided for display as a graphical representation of motion-detection capability within the space.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, the systems and techniques described here allow for analyzing Wi-Fi motion coverage in an environment.

In a first example, a method includes receiving a ground-truth motion indication from a measurement device. The ground-truth motion indication is a time series of locations and a corresponding indication of a motion state at each location of the time series of locations. The method also includes receiving a time series of detected motion states based on wireless signals communicated through a space over a time period by a wireless communication network comprising a plurality of wireless communication devices. The detected motion states for a time interval within the time series are compared to the ground-truth motion indication for the time interval within the time series to generate a time series of consistency scores. The consistency scores are processed to produce an aggregate motion-detection capability score at each location. The method also includes providing, for display as a graphical representation of motion-detection capability within the space, the aggregate motion-detection capability at each location.

Implementations of the first example may include determining a first difference between a first time stamp of a wireless communication device of the plurality of wireless communication devices and a standard, determining a second difference between a second time stamp of the measurement device and the standard, transmitting the determined difference to the measurement device, and synchronizing the second time stamp to the first time stamp.

Implementations of the first example may include determining a distance between the measurement device and a plurality of wireless network devices. The method may also include utilizing the determined distance to triangulate a position of the measurement device and continuously updating the position of the measurement device. In such implementations, the distance may be determined by, for example, time-of-flight measurements or Wi-Fi ranging.

Implementations of the first example may include indicating a ground-truth motion path on the measurement device. In such implementations, the ground-truth motion path may be traced on a graphical representation of the space.

Implementations of the first example may include displaying the graphical representation as a heat map that illustrates motion-detection capability of portions of the space. Implementations of the first example may also include indicating an elapsed time of motion for a plurality of segments of the ground-truth motion indication.

In a second example, a system includes a plurality of wireless communication devices in a wireless communication network and a computer device having one or more processors operable to perform operations including receiving a ground-truth motion indication from a measurement device. The ground-truth motion indication is a time series of locations and a corresponding indication of a motion state at each location of the time series of locations. The method also includes receiving a time series of detected motion states based on wireless signals communicated through a space over a time period by a wireless communication network comprising a plurality of wireless communication devices. The detected motion states for a time interval within the time series are compared to the ground-truth motion indication for the time interval within the time series to generate a time series of consistency scores. The consistency scores are processed to produce an aggregate motion-detection capability score at each location. The method also includes providing, for display as a graphical representation of motion-detection capability within the space, the aggregate motion-detection capability at each location.

Implementations of the second example may include determining a first difference between a first time stamp of a wireless communication device of the plurality of wireless communication devices and a standard, determining a second difference between a second time stamp of the measurement device and the standard, transmitting the determined difference to the measurement device, and synchronizing the second time stamp to the first time stamp.

Implementations of the second example may include determining a distance between the measurement device and a plurality of wireless network devices. The method may also include utilizing the determined distance to triangulate a position of the measurement device and continuously updating the position of the measurement device. In such implementations, the distance may be determined by, for example, time-of-flight measurements or Wi-Fi ranging.

Implementations of the second example may include indicating a ground-truth motion path on the measurement device. In such implementations, the ground-truth motion path may be traced on a graphical representation of the space.

Implementations of the second example may include displaying the graphical representation as a heat map that illustrates motion-detection capability of portions of the space. Implementations of the first example may also include indicating an elapsed time of motion for a plurality of segments of the ground-truth motion indication.

In a third example, a non-transitory computer-readable medium contains program instructions for causing a data-processing apparatus to perform operations including receiving a ground-truth motion indication from a measurement device. The ground-truth motion indication is a time series of locations and a corresponding indication of a motion state at each location of the time series of locations. The method also includes receiving a time series of detected motion states based on wireless signals communicated through a space over a time period by a wireless communication network comprising a plurality of wireless communication devices. The detected motion states for a time interval within the time series are compared to the ground-truth motion indication for the time interval within the time series to generate a time series of consistency scores. The consistency scores are processed to produce an aggregate motion-detection capability score at each location. The method also includes providing, for display as a graphical representation of motion-detection capability within the space, the aggregate motion-detection capability at each location.

Implementations of the third example may include determining a first difference between a first time stamp of a wireless communication device of the plurality of wireless communication devices and a standard, determining a second difference between a second time stamp of the measurement device and the standard, transmitting the determined difference to the measurement device, and synchronizing the second time stamp to the first time stamp.

Implementations of the third example may include determining a distance between the measurement device and a plurality of wireless network devices. The method may also include utilizing the determined distance to triangulate a position of the measurement device and continuously updating the position of the measurement device. In such implementations, the distance may be determined by, for example, time-of-flight measurements or Wi-Fi ranging.

Implementations of the third example may include indicating a ground-truth motion path on the measurement device. In such implementations, the ground-truth motion path may be traced on a graphical representation of the space.

Implementations of the third example may include one or more of the following features. One of the wireless communication devices can be or include the computer device. The computer device can be located remote from the wireless communication devices.

Implementations of the third example may include displaying the graphical representation as a heat map that illustrates motion-detection capability of portions of the space. Implementations of the first example may also include indicating an elapsed time of motion for a plurality of segments of the ground-truth motion indication.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
    receiving a ground-truth motion indication from a measurement device, the ground-truth motion indication comprising a time series of locations and a corresponding indication of a motion state at each location of the time-series of locations;
    receiving a time-series of detected motion states based on wireless signals communicated through a space over a time period by a wireless communication network comprising a plurality of wireless communication devices;
    comparing the detected motion states for a time interval within the time series to the ground-truth motion indication for the time interval within the time series to generate a time-series of consistency scores;
    processing the time series of consistency scores to produce an aggregate motion-detection capability score at each location; and
    providing, for display as a graphical representation of motion-detection capability within the space, the aggregate motion-detection capability at each location.

2. The method of claim 1, further comprising:
    determining a first difference between a first time stamp of a wireless communication device of the plurality of wireless communication devices and a standard;
    determining a second difference between a second time stamp of the measurement device and the standard;
    transmitting the determined difference to the measurement device; and
    synchronizing the second time stamp to the first time stamp.

3. The method of claim 1, wherein the receiving the ground-truth motion indication comprises:
    determining a distance between the measurement device and a plurality of wireless communication devices;
    utilizing the determined distance to triangulate a position of the measurement device; and
    continuously updating the position of the measurement device.

4. The method of claim 3, wherein the distance is determined by time-of-flight measurements.

5. The method of claim 3, wherein the distance is determined by Wi-Fi ranging.

6. The method of claim 1, wherein the receiving the ground-truth motion indication comprises indicating a ground-truth motion path on the measurement device.

7. The method of claim 6, wherein the receiving the ground-truth motion indication comprises tracing a ground-truth motion path on a graphical representation of the space.

8. The method of claim 1, wherein the graphical representation is a heat map that displays motion-detection capability of portions of the space.

9. The method of claim 1, wherein graphical representation displays an elapsed time of motion for a plurality of segments of the ground-truth motion indication.

10. A system comprising:
a plurality of wireless communication devices in a wireless communication network;
a computer device comprising one or more processors operable to perform operations comprising:
receiving a ground-truth motion indication from a measurement device, the ground-truth motion indication comprising a time series of locations and a corresponding indication of a motion state at each location of the time-series of locations;
receiving a time-series of detected motion states based on wireless signals communicated through a space over a time period by a wireless communication network comprising a plurality of wireless communication devices;
comparing the detected motion states for a time interval within the time series to the ground-truth motion indication for the time interval within the time series to generate a time-series of consistency scores;
processing the time series of consistency scores to produce an aggregate motion-detection capability score at each location; and
providing, for display as a graphical representation of motion-detection capability within the space, the average motion-detection capability at each location.

11. The system of claim 10, further comprising:
determining a first difference between a first time stamp of a wireless communication device of the plurality of wireless communication devices and a standard;
determining a second difference between a second time stamp of the measurement device and the standard;
transmitting the determined difference to the measurement device; and
synchronizing the second time stamp to the first time stamp.

12. The system of claim 10, wherein the receiving the ground-truth motion indication comprises:
determining a distance between the measurement device and a plurality of wireless communication devices;
utilizing the determined distance to triangulate a position of the measurement device; and
continuously updating the position of the measurement device.

13. The system of claim 12, wherein the distance is determined by time-of-flight measurements.

14. The system of claim 12, wherein the distance is determined by Wi-Fi ranging.

15. The system of claim 10, wherein the receiving the ground-truth motion indication comprises indicating a ground-truth motion path on the measurement device.

16. The system of claim 15, wherein the receiving the ground-truth motion indication comprises tracing a ground-truth motion path on a graphical representation of the space.

17. The system of claim 10, wherein the graphical representation is a heat map that displays motion-detection capability of portions of the space.

18. The system of claim 10, wherein graphical representation displays an elapsed time of motion for a plurality of segments of the ground-truth motion indication.

19. A non-transitory computer-readable medium containing program instructions for causing a data processing apparatus to perform operations comprising:
receiving a ground-truth motion indication from a measurement device, the ground-truth motion indication comprising a time series of locations and a corresponding indication of a motion state at each location of the time-series of locations;
receiving a time-series of detected motion states based on wireless signals communicated through a space over a time period by a wireless communication network comprising a plurality of wireless communication devices;
comparing the detected motion states for a time interval within the time series to the ground-truth motion indication for the time interval within the time series to generate a time-series of consistency scores;
processing the time series of consistency scores to produce an aggregate motion-detection capability score at each location; and
providing, for display as a graphical representation of motion-detection capability within the space, the average motion-detection capability at each location.

20. The non-transitory computer-readable medium of claim 19, further comprising:
determining a first difference between a first time stamp of a wireless communication device of the plurality of wireless communication devices and a standard;
determining a second difference between a second time stamp of the measurement device and the standard;
transmitting the determined difference to the measurement device; and
synchronizing the second time stamp to the first time stamp.

21. The non-transitory computer-readable medium of claim 19, wherein the receiving the ground-truth motion indication comprises:
determining a distance between the measurement device and a plurality of wireless communication devices;
utilizing the determined distance to triangulate a position of the measurement device; and
continuously updating the position of the measurement device.

22. The non-transitory computer-readable medium of claim 21, wherein the distance is determined by time-of-flight measurements.

23. The non-transitory computer-readable medium of claim 21, wherein the distance is determined by Wi-Fi ranging.

24. The non-transitory computer-readable medium of claim 19, wherein the receiving the ground-truth motion indication comprises indicating a ground-truth motion path on the measurement device.

25. The non-transitory computer-readable medium of claim 24, wherein the receiving the ground-truth motion indication comprises tracing a ground-truth motion path on a graphical representation of the space.

26. The non-transitory computer-readable medium of claim 19, wherein the graphical representation is a heat map that displays motion-detection capability of portions of the space.

27. The non-transitory computer-readable medium of claim 19, wherein graphical representation displays an elapsed time of motion for a plurality of segments of the ground-truth motion indication.

\* \* \* \* \*